United States Patent [19]

Swire

[11] Patent Number: 5,522,067
[45] Date of Patent: May 28, 1996

[54] WORKING STORAGE MANAGEMENT IN MEDICAL IMAGING SYSTEMS

[75] Inventor: Alan J. Swire, West Henrietta, N.Y.

[73] Assignee: Eastman Kodak Company, Rochester, N.Y.

[21] Appl. No.: 459,607

[22] Filed: Jun. 2, 1995

Related U.S. Application Data

[63] Continuation of Ser. No. 948,181, Sep. 21, 1992, abandoned.

[51] Int. Cl.$^6$ ............................... G06F 15/00; G06F 3/00
[52] U.S. Cl. .............. 395/600; 364/413.13; 364/DIG. 2; 364/922; 364/927.97; 364/930; 395/404; 395/462; 395/463; 395/164
[58] Field of Search .................................. 395/600, 404, 395/462, 463, 164; 364/413.13, DIG. 2

[56] References Cited

U.S. PATENT DOCUMENTS

| | | | |
|---|---|---|---|
| 4,168,541 | 9/1979 | DeKarske | 365/230 |
| 4,186,438 | 1/1980 | Benson et al. | 364/200 |
| 4,229,789 | 10/1980 | Morgan et al. | 364/200 |
| 4,426,682 | 1/1984 | Riffe | 395/425 |
| 4,442,488 | 4/1984 | Hall | 364/200 |
| 4,817,050 | 3/1989 | Komatsu et al. | 364/900 |
| 4,833,625 | 5/1989 | Fisher et al. | 364/518 |
| 4,868,734 | 9/1989 | Idleman et al. | 364/200 |
| 4,870,577 | 9/1989 | Karasawa et al. | 364/405 |
| 4,961,134 | 10/1990 | Crus et al. | 364/200 |
| 4,967,353 | 10/1990 | Brenner et al. | 364/200 |
| 4,969,088 | 11/1990 | McAuliffe et al. | 364/200 |
| 5,008,820 | 4/1991 | Christopher, Jr. et al. | 364/200 |
| 5,043,870 | 8/1991 | Ditzel | 395/425 |
| 5,226,141 | 7/1993 | Esbensen | 395/425 |
| 5,231,514 | 7/1993 | Nakamura | 358/444 |
| 5,287,521 | 2/1994 | Nitta et al. | 395/725 |
| 5,339,412 | 8/1994 | Fueki | 395/600 |

*Primary Examiner*—Thomas G. Black
*Assistant Examiner*—Jean R. Homere
*Attorney, Agent, or Firm*—William F. Noval

[57] ABSTRACT

Apparatus manages short term working storage memory in data processing systems such as medical imaging systems. The working storage has a predetermined full storage capacity, a preselected high water mark storage capacity and a preselected low water mark storage capacity. A control monitors the current storage capacity of the working storage such that if the current storage capacity is greater than or equal to the high water mark, the control deletes digital images having designated status characteristics from working storage until the low water mark is reached.

3 Claims, 4 Drawing Sheets

WORKING STORAGE MANAGEMENT IN MEDICAL IMAGING SYSTEMS

This is a continuation of application U.S. Ser. No. 948,181, filed 21 Sep. 1992, now abd.

FIELD OF THE INVENTION

This invention relates in general to the management of memory storage in data processing systems and more particularly to the management of short-ten working storage in medical imaging systems.

DESCRIPTION OF THE RELEVANT ART

It is frequently desirable in data processing applications to use short-term memory (working storage) to provide fast and easy access to frequently used data. The working storage accumulates a number of data blocks, such as digital images, which are temporarily stored for subsequent near term use. In a typical medical imaging system, digital radiographic images are acquired from a variety of image sources such as diagnostic image scanners (MRI, CT, US, PET), radiographic film digitizers, and storage phosphor readers. The acquired digital images are temporarily stored in working storage until they are utilized or deleted. Image utilization, may, for example, include (1) changing the image characteristics of the digital image in an image processing environment; (2) displaying the digital image on a display device such as a video monitor; (3) producing a hard copy of the digital image by means of a laser printer or multiformat camera; and (4) archiving the digital image in long term memory such as an optical disk.

The working storage device typically includes a rapid access magnetic disk drive which has sufficient memory size to support both acquisition of new digital images and current utilization of already acquired digital images. A problem arises in the management of the capacity of the working storage memory to maintain the usage level of the magnetic storage within configurable limits. Otherwise, the working storage would be filled to full capacity and other application programs would be prevented from continuing their execution. In terms of performance, the retrieval of digital images from the working storage memory is significantly faster than retrieval of digital images from optical disk devices. Therefore, it is desirable that those digital images that have the highest probability of being retrieved in the near future should exist in working storage in order to be retrieved in the minimal amount of time.

As disclosed in the following patents, various techniques have been proposed to manage the capacity of a temporary storage device to effect the most efficient use of data in a given data processing application. Many of these patents utilize a data replacement technique wherein the least recently used data is deleted from the temporary storage device to be replaced by the most recently acquired data. Such techniques are not entirely satisfactory in maintaining working storage in medical imaging applications. U.S. Pat. No. 4,817,050, issued Mar. 28, 1989, inventors Komatsu et al; U.S. Pat. No. 4,833,625, issued May 23, 1989, inventors Fisher et al; U.S. Pat. No. 4,870,577, issued Sep. 26, 1989, inventors Karasawa et al; U.S. Pat. No. 4,868,734, issued Sep. 19, 1989, inventors Idleman et al; U.S. Pat. No. 4,442,488, issued Apr. 10, 1984, inventor Hall; U.S. Pat. No. 4,967,353, issued Oct. 30, 1990, inventors Brenner et al; U.S. Pat. No. 4,229,789, issued Oct. 21, 1980, inventors Morgan et al; U.S. Pat. No. 4,168,541, issued Sep. 18, 1979, inventor DeKarske; U.S. Pat. No. 5,008,820, issued Apr. 16, 1991, inventors Christopher, Jr. et al; U.S. Pat. No. 4,969,088, issued Nov. 6, 1990, inventors McAuliffe et al; U.S. Pat. No. 4,186,438, issued Jan. 29, 1980, inventors Benson et al.

SUMMARY OF THE INVENTION

According to the present invention there is provided new and improved memory management apparatus which solves the problems of known apparatus for managing short-term memory in data processing systems. According to an aspect of the present invention, there is provided memory management apparatus comprising working storage means for storing, for a short term, a number of digital images; wherein said working storage means has a predetermined full storage capacity, a preselected high water mark storage capacity equal to or less than said full storage capacity, and a preselected low water mark storage capacity less than said high water mark storage capacity; and control means for monitoring the current storage capacity of said working storage means such that if said current storage capacity of said working storage means is greater than or equal to said high water mark storage capacity, said control means deletes digital images having designated status characteristics from said working storage means until said low water mark storage capacity is reached.

DESCRIPTION OF THE PREFERRED EMBODIMENTS

Although in the following description of preferred embodiments of the present invention, reference will be made to imaging systems, it will be understood by those skilled in the art that the present invention is applicable to other data handling systems including management of short term memory.

Figure 1:
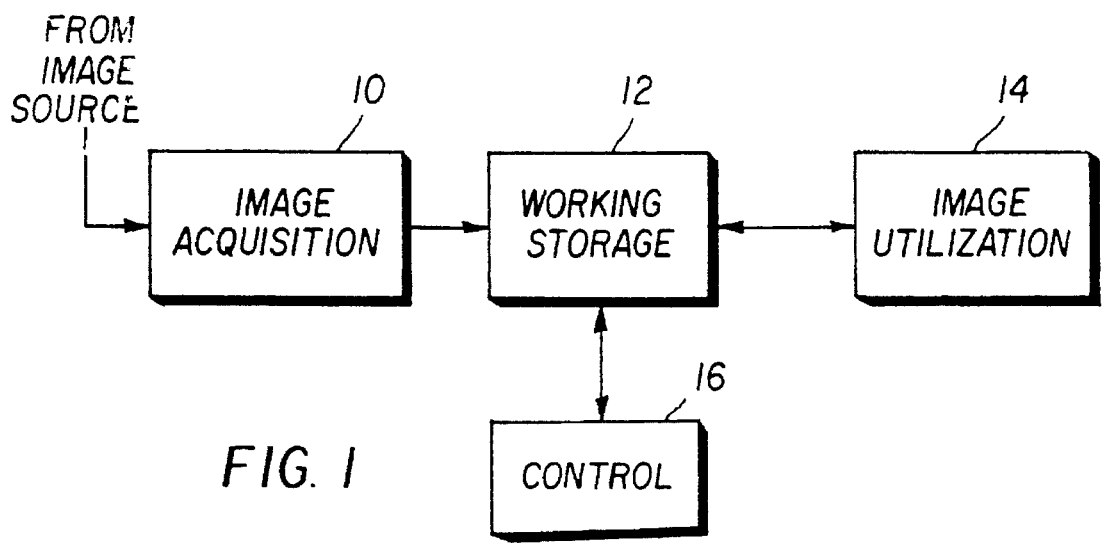
FIG. 1 is a block diagram of a data system incorporating an embodiment of the present invention.

Referring now to FIG. 1, there is shown a block diagram of an imaging system incorporating an embodiment of the memory management apparatus of the present invention. As shown, image acquisition circuit 10 receives a digital image from a digital image source. The digital image acquired by acquisition circuit 10 is stored for a short term in working storage 12 (which may, for example, be a hard drive magnetic disk). Working storage 12 has a memory capacity which is sufficient to store a number of digital images in order to maintain effective operation of the digital imaging system. For example, if a digital image acquired by acquisition circuit 10 includes 10 megabytes of digital data, and working storage 12 has a memory capacity of 500 megabytes, storage 12 has the capacity to store 50 digital images.

Working storage 12 is controlled by control 16 which includes a computer such as a microprocessor. Working storage 12 is connected to an image utilization device 14 which receives digital images from working storage 12 for utilization of the image. Image utilization device 14 may, for example, be an image processing unit, an image display device such as a video monitor, a hard copy output device such as a multiformat camera, or laser printer.

According to the present invention, the memory capacity of working storage 12 is managed to maintain the usage level of the working storage memory within configurable limits. The working storage routine strives to keep digital images in working storage 12 that have the greatest probability of being retrieved in the near future and to purge those digital images which have the least likelihood of being retrieved in the near future. Control 16 periodically monitors the amount of memory used by digital images stored in working storage 12. Working storage 12 has (1) a predetermined full storage capacity; (2) a preselectable high water mark storage capacity equal to or less than said full storage capacity; and (3) a preselected low water mark storage capacity less than said high water mark storage capacity. Control 16 determines the working storage memory size, a working storage high water mark, a working storage low water mark, and one or more designated status characteristics for each digital image stored. The designated status characteristics can include the usage count of a digital image, the time when a digital image was last used (retention time), whether the image is locked or unlocked (i.e., an image that cannot or can be deleted). The working storage high water mark and working storage low water mark are designated in terms of percentage of working storage size or actual working storage in megabytes.

Figure 5:
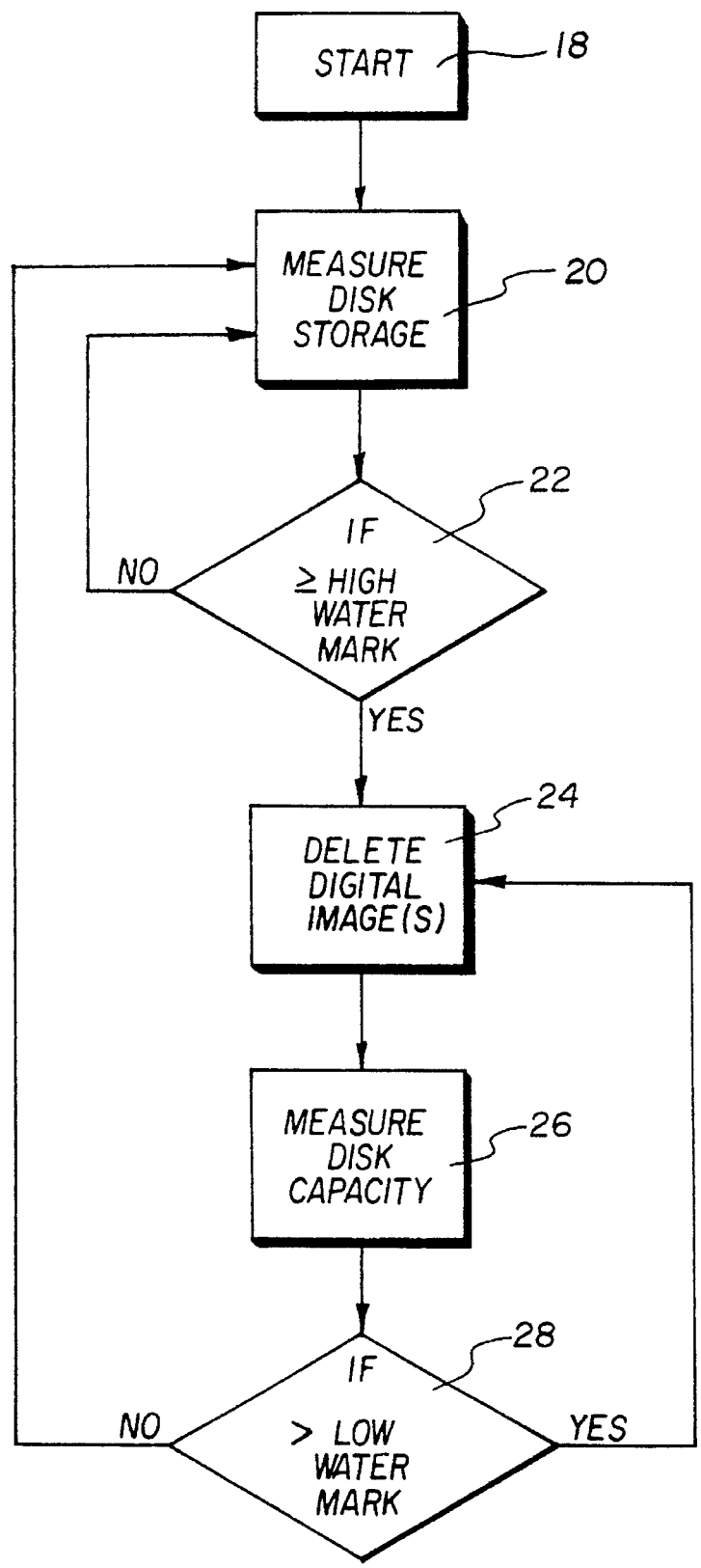
FIG. 5 is a flow diagram useful in explaining the operation of the memory management system of the present invention.

As shown in the flow diagram of FIG. 5, the digital image deletion routine starts at start bubble 18. The routine proceeds to measure current disk storage size (box 20). The first inquiry (diamond 22) is whether or not measured disk storage is greater than or equal to the high water mark. If the answer is no, the routine is branched back to box 20. If the answer is yes, there is executed (box 24) the deletion of a digital image or images from working storage 12 as a function of designated status characteristics (as explained above). The working storage size is then measured (box 26) and compared to the low water mark (diamond 28). If it is decided (i.e., "yes") that the working storage size is greater than the low water mark the routine is branched back to box 24 and another digital image or study is deleted from working storage 12. If it is decided that the working storage size is less than or equal to the low water mark (i.e., "no") the routine is branched back to box 20.

Figure 2:
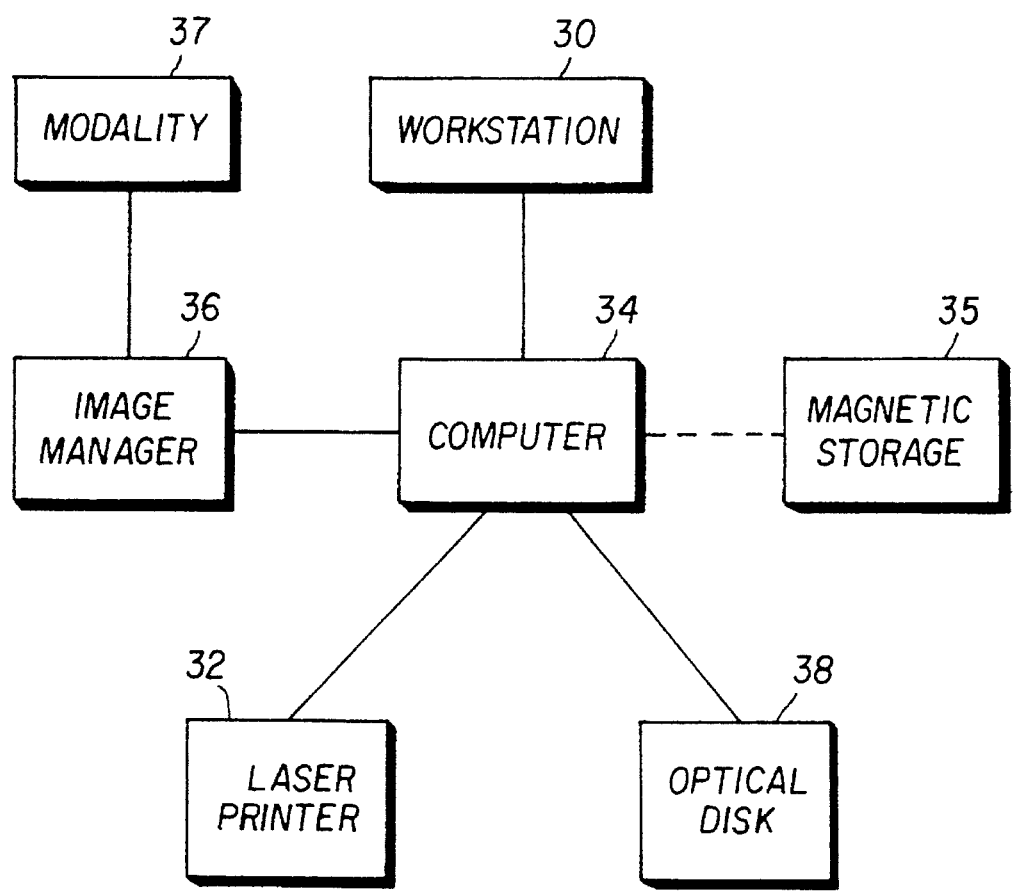
FIG. 2 is a diagrammatic view of a medical imaging system incorporating the memory management apparatus of the present invention.

Referring now to FIG. 2 there is shown a medical imaging system incorporating an embodiment of the present invention. The system shown is intended to provide radiologists and radiology technologists with the ability to retrieve radiographic images from magnetic or optical disk storage. These images are reviewed on a computer workstation 30 or printed on a film radiograph by a laser printer 32. A collection of related radiographic images for a single patient is known as a study. The study is organized into a sequence of pages, which in turn are comprised of 1 or more images.

The EPM-Electronic Page Manager (including memory management) system resides in a computer 34 that is attached (1) to a laser printer 32 such as a Kodak EKTAS-CAN Laser Printer (KELP), a radiograph printing device, (2) to an image acquisition device 36, such as a KODAK EKTASCAN Image Manager (KEIM) which acquires images from a medical imaging modality (MRI, CT, US, PET) 37, and (3) to an optical disk subsystem 38, an archival device such as the Kodak Optical Disk Library 6800-ADL. The computer 34 includes a hard-drive magnetic disk storage device 35, which stores the EPM database, executable programs, and short term magnetic working storage.

Figure 6:
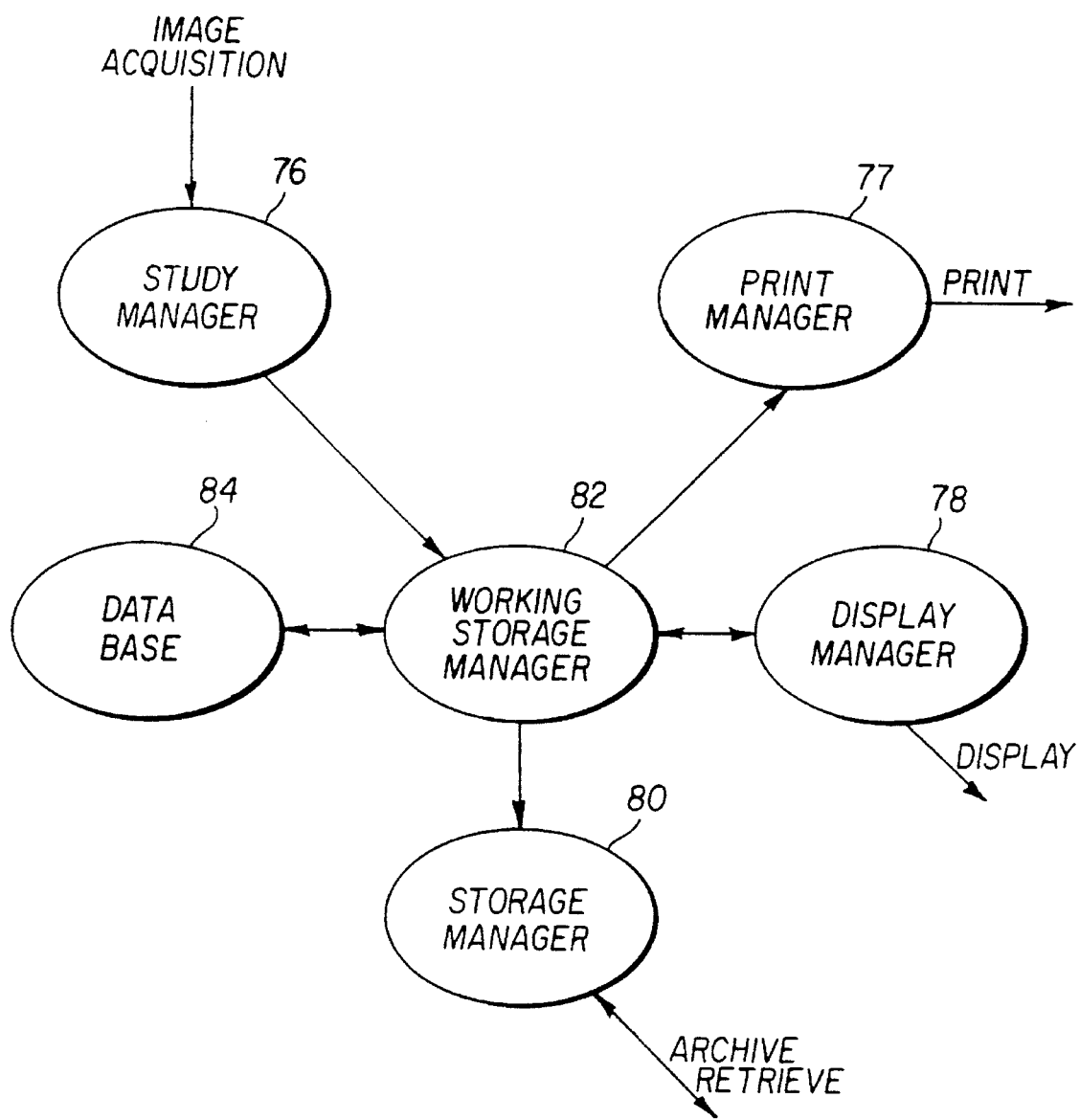
FIG. 6 is a diagram useful in explaining the operation of the system of FIG. 2.

The computer 34 controlling the EPM is shown as running in a multi-tasking, Unix environment. This environment provides the infrastructure to enable the simultaneous execution of the several software programs that comprise the EPM. As shown in FIG. 6, the programs include the Study Manager 76, which is responsible for the acquisition of studies, the Print Manager 77, which is responsible for the printing of study pages, the Display Manager 78, which is responsible for the selection and viewing of study pages and images for the purpose of reprinting study pages, the Storage Manager 80, which is responsible for the storage of studies onto optical disk devices and the retrieval of studies from either magnetics or optical disk devices, and the Working Storage Manager 82, which is responsible for maintaining an optimum level of usage for the computer's limited magnetics storage resources.

The EPM programs share a common directory in magnetics storage, known as Working Storage. Working Storage contains studies being acquired, stored, printed, and/or displayed. The management of studies within the Working Storage is the responsibility of the Working Storage Manager program. It is the responsibility of this program to maintain the usage level of the computer's magnetic storage within configurable limits. Without this program, the other EPM programs would fill the computer's magnetics working storage with studies to full capacity. This would prevent the other EPM programs from continuing their execution.

In terms of performance, the retrieval of studies from computer's magnetics is significantly faster than retrieval of studies from optical disk devices 38. Therefore, it is important that those studies that have the highest probability of being retrieved in the near future should exist in Working Storage, in order to be retrieved in the minimal amount of time. The procedures implemented in Working Storage Manager 82 strive to keep studies in magnetics that have the greatest probability of being retrieved in the near future, and to purge those who have the least likelihood of being retrieved in the near future.

Each study in Working Storage 12 has a corresponding entry in the EPM database DB 84. Due to performance concerns and memory limitations, only a single copy of the study is maintained in Working Storage 12 for usage by the EPM programs. For the purpose of managing the usage of studies in Working Storage 12 each database entry contains a field called req_pending. This field is the usage count for that particular study. The Study Manager 76 and Display Manager 78 increment the usage count whenever they request a Study Page to be printed. The Study Manager 76 increments the usage count whenever it requests a study to be stored. The Storage Manager 80 decrements the usage count whenever it stores a study, and increments the usage count whenever it retrieves a study. The Print Manager 77 decrements the usage count whenever it prints the requested study pages. The req_pending usage count acts as a semaphore for the purpose of preventing software deadlock among the EPM programs.

Another field in the database entry in DB 84 is called last_access. This tracks the most recent time that the corresponding study has been accessed for viewing, printing, acquisition, or storage.

The Working Storage Manager 82 maintains the amount of magnetics memory used by Working Storage 12 to a level within acceptable configurable limits. The configuration parameters employed by the Working Storage Manager 82 are a High Water Mark, signifying the upper end limit of acceptable Working Storage usage, and a Low Water Mark, signifying the level to which the Working Storage Manager program should reduce Working Storage after the High Water Mark has been reached. This operation is analogous to that of a thermostat that controls temperature within acceptable limits. A key feature of this invention is the procedure that is employed by the Working Storage Manager 82 to select studies that may be deleted from Working Storage 12 to achieve reduction of Working Storage 12 to the Low Water Mark.

The Working Storage Manager 82 continuously monitors the Working Storage 12 usage and compares the level of usage to the High Water Mark. If the level of usage exceeds the High Water Mark, it is the responsibility of the Working Storage Manager 82 to reduce the usage of Working Storage 12 to that of the Low Water Mark. This is accomplished by repeatedly deleting studies from Working Storage 12 and comparing the new level of Working Storage to that of the Low Water Mark. Once the Low Water Mark has been reached, the Working Storage Manager 82 resumes its continuous monitoring process.

The Working Storage Manager 82 deletes studies according to designated status characteristics of a study and may not delete any study from Working Storage 12 whose corresponding entry in the database has a usage count greater than zero. In addition, the studies most recently acquired, printed, stored, or viewed, are the ones most likely to be printed or viewed in the near future. Given this criteria, the Working Storage Manager 82 selects studies to be deleted by the following algorithm: "Select the least recently accessed study, with usage count equal to zero".

The system of FIG. 2 has the following advantages. The Working Storage Manager 82, in cooperation with the EPM database 84, maximizes the usage of the computer's 34 limited magnetic resources. This provides a marked increase in system performance, both in the automated process of storing and printing studies, as well as in the human selection and viewing of studies. The procedure employed to select studies for deletion maintains the most useful studies within Working Storage 82, and decreases the likelihood of encountering large time penalties which would be incurred if the studies needed to be retrieved from optical disk.

Figure 3:
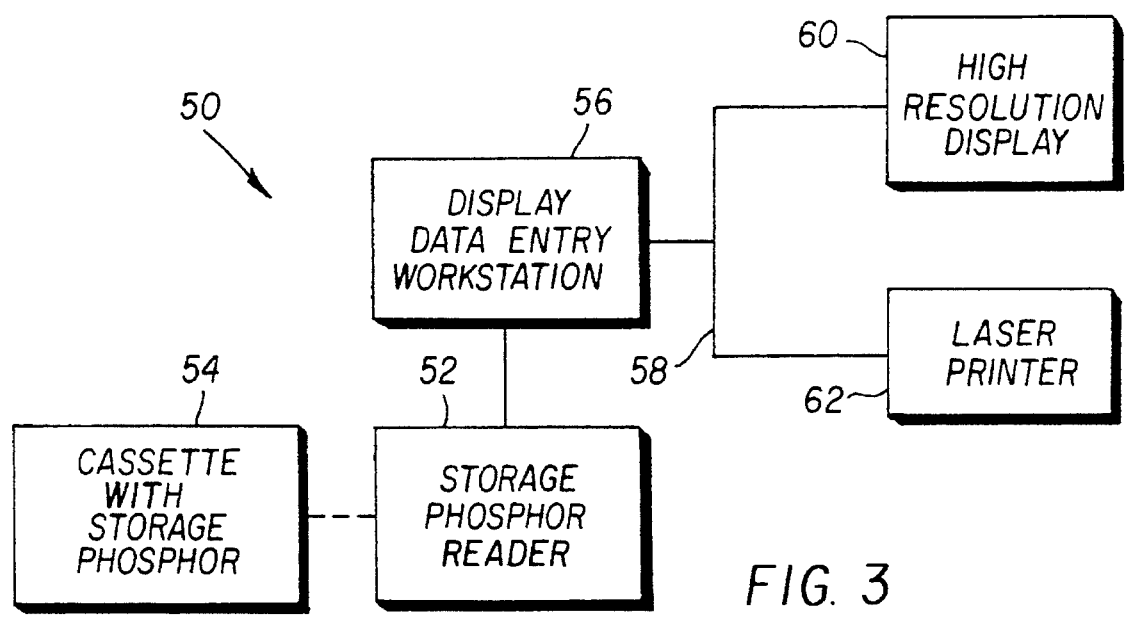
FIG. 3 is a diagrammatic view of another medical imaging system incorporating the memory management apparatus of the present invention.
Figure 4:
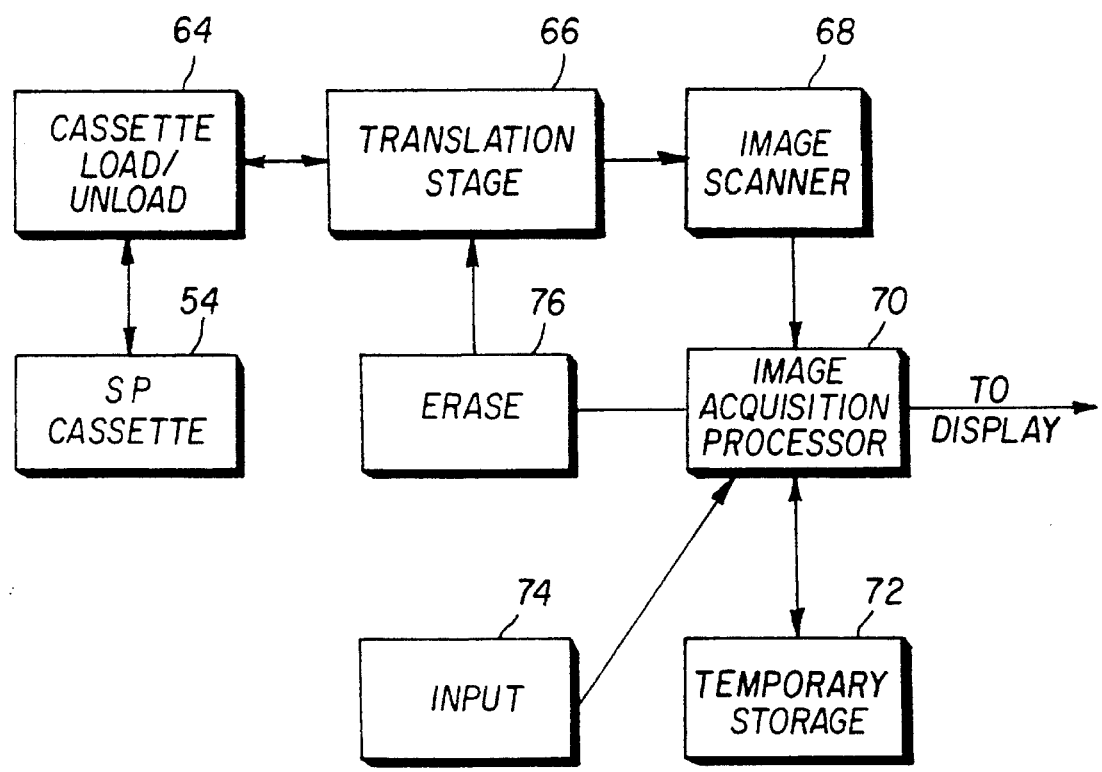
FIG. 4 is a block diagram of the storage phosphor reader of the medical imaging system of FIG. 3.

Referring now to FIGS. 3 and 4 there is shown a computed radiography medical imaging system incorporating an embodiment of the present invention. As shown in FIG. 3 imaging system 50 includes a storage phosphor reader 52 such as the Kodak Ektascan Storage Phosphor reader. Reader 52 receives a storage phosphor contained in cassette 54 and converts a latent radiographic image in the storage phosphor into a digital image which is supplied to display and data entry workstation 56. Workstation 56 allows a user to view the digital image from the storage phosphor before it is released. It also functions as the database server upon which demographic database resides. Workstation 56 provides an interactive data entry interface for the user and can print patient identification labels. A communication link 58 such as an Ethernet link receives the digital image from terminal 56 and supplies it to a high resolution display 60 and/or laser printer 62. Display 60 has a resolution which permits a diagnostician to view a radiographic image for diagnostic purposes. Laser printer 62 produces a hard copy radiographic image of the digital image read from the storage phosphor by reader 52.

As shown in FIG. 4, storage phosphor reader 52 includes a cassette load and unload mechanism 64 which extracts and returns a storage phosphor from and to storage phosphor cassette 54. A translation stage 66 moves a loaded storage phosphor past a laser image scanner 68 which scans the storage phosphor with stimulating radiation to produce emitted radiation which is detected by a photodetector to produce an electrical image which is digitized. The digitized x-ray image is applied to image acquisition processor 70 which computes a tone scale look-up table and transmits the digitized image to display terminal 56. A temporary storage 72 is provided for patient I.D. information and conditions of x-ray exposure. Input 74 allows user control of the storage phosphor reader 52. Storage phosphor reader 52 includes a bank of erase lamps which effect the erase function indicated by block 76 to erase the latent image on storage phosphor. The translation stage 66 and cassette load/unload assembly 64 then returns the erased storage phosphor to cassette 54 for reuse.

Working storage forms a part of a hard drive magnetic disc in workstation 56. According to the invention, digital images acquired by reader 52 are stored in the working storage. The date and time of each digital image (exam) is retained in a database. The acquired digital image is processed for edge enhancement and tone scale at workstation 56. The digital image has the following designated status characteristics, locked or unlocked, retention time. Locked or unlocked status designates whether the image is being used or not. Retention time is the amount of time the image has been retained. Images in working storage which are unlocked and have a retention time greater than a configurable time (e.g., 36 hours) are candidates for deletion by the working storage manager.

Although this invention has been described with reference to preferred embodiments thereof, it will be understood that variations and modifications can be effected within the spirit and scope of the invention as described above and as defined in the appended claims.

What is claimed is:

1. In a medical imaging system including a medical image acquisition device, a working storage memory for short term storage of medical images, a display for displaying a medical image, a printer for printing a copy of a medical image, a long term memory for long term storage of medical images, and a data base for storing information about medical images stored in said working storage memory; the method of managing the capacity of said working storage memory to maintain the usage level of said working storage memory within selected limits, said method comprising the steps of:

assigning to said working storage memory a high water mark storage capacity and a low water mark storage capacity less than said high water mark storage capacity;

for each medical image stored in said working storage memory, storing in said data base, usage count data representing the usage count of each said stored medical image, and last access data representing the most recent time that said image has been accessed for display, printing, acquisition, or long term storage; wherein said usage count data is incremented, a) when a request is made to print a medical image stored in said working storage memory, or b) when a request is made to store a medical image from said medical image acquisition device in said working storage memory, or c) when a request is made to retrieve a medical image from said long term memory for storage in said working storage memory; and the usage count data is decremented, a) when a medical image is printed by said printer, or b) when a medical image is stored in said long term memory; and continuously monitoring the current storage capacity of said working storage memory by comparing said current storage capacity to said high water mark storage capacity, and if the current storage capacity exceeds said high water mark storage capacity, repeatedly deleting medical images from said working storage memory until said current storage equals or is less than said low water mark working storage; wherein said medical images are deleted according to the rule "delete the least recently accessed study with usage count equal to zero".

2. The method of claim 1 wherein in said assigning step said high water mark capacity and said low water mark capacity are defined in terms of percentages of a predetermined full storage capacity of said working storage memory.

3. The method of claim 1 wherein if said usage count data stored in said database is greater than zero the corresponding medical image is marked as locked, and if said usage count data stored in said database is zero the corresponding medical image is marked as unlocked; and wherein in said monitoring and deleting step only medical images marked as unlocked are deleted.

* * * * *